(12) United States Patent
Kurikuma et al.

(10) Patent No.: US 8,972,121 B2
(45) Date of Patent: Mar. 3, 2015

(54) ELECTROMOTIVE DRIVE DEVICE FOR CONSTRUCTION MACHINE

(75) Inventors: Hajime Kurikuma, Koka (JP); Tatsuo Takishita, Koka (JP); Yuta Nakamura, Koka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 14 days.

(21) Appl. No.: 13/984,396

(22) PCT Filed: Apr. 12, 2012

(86) PCT No.: PCT/JP2012/060083
§ 371 (c)(1),
(2), (4) Date: Aug. 8, 2013

(87) PCT Pub. No.: WO2012/144428
PCT Pub. Date: Oct. 26, 2012

(65) Prior Publication Data
US 2013/0325235 A1    Dec. 5, 2013

(30) Foreign Application Priority Data
Apr. 19, 2011    (JP) .................................. 2011-093459

(51) Int. Cl.
*G06G 7/00*    (2006.01)
*E02F 3/00*    (2006.01)
(Continued)

(52) U.S. Cl.
CPC ............... *E02F 9/2058* (2013.01); *E02F 9/207* (2013.01); *E02F 9/2091* (2013.01);
(Continued)

(58) Field of Classification Search
USPC .......................................................... 701/50
See application file for complete search history.

(56) References Cited

U.S. PATENT DOCUMENTS

| | | | |
|---|---|---|---|
| 6,666,022 B1 * | 12/2003 | Yoshimatsu et al. ............ | 60/413 |
| 2002/0104239 A1 * | 8/2002 | Naruse et al. ................... | 37/348 |

(Continued)

FOREIGN PATENT DOCUMENTS

| | | |
|---|---|---|
| JP | 2000-273913 A | 10/2000 |
| JP | 2001-012418 A | 1/2001 |

(Continued)

OTHER PUBLICATIONS

International Preliminary Report on Patentability received in International Application No. PCT/JP2012/060083 dated Oct. 31, 2013.

*Primary Examiner* — Fadey Jabr
*Assistant Examiner* — Thomas Ingram
(74) *Attorney, Agent, or Firm* — Mattingly & Malur, PC

(57) ABSTRACT

An electromotive drive device of an electric motor-driven mini-excavator, which is capable of lengthening its operating time, includes an electric power storage device, a motor-generator, a hydraulic pump, a plurality of directional control valves which respectively control the flow of pressurized fluid, and a plurality of operating devices which respectively operate the plurality of directional control valves. The electromotive drive device is provided with a bidirectional converter which decelerates the motor-generator to an idle revolution speed when X seconds have elapsed in a state in which the plurality of directional control valves are all not operated. The bidirectional converter performs regenerative control to convert an inertial force of a rotor of the motor-generator to power and charge the electric power storage device when it decelerates the motor-generator from a standard revolution speed to the idle revolution speed.

6 Claims, 10 Drawing Sheets

(51) Int. Cl.
*E02F 9/20* (2006.01)
*E02F 9/22* (2006.01)
*B60L 7/14* (2006.01)
*B60L 11/18* (2006.01)
*B60L 15/20* (2006.01)
*E02F 3/32* (2006.01)
*H02J 7/14* (2006.01)

(52) U.S. Cl.
CPC ............ *E02F 9/2246* (2013.01); *E02F 9/2282* (2013.01); *E02F 9/2285* (2013.01); *B60L 7/14* (2013.01); *B60L 11/1803* (2013.01); *B60L 15/2009* (2013.01); *E02F 3/325* (2013.01); *E02F 9/2075* (2013.01); *E02F 9/2217* (2013.01); *H02J 7/14* (2013.01); *B60L 2200/40* (2013.01); *B60L 2210/12* (2013.01); *B60L 2240/421* (2013.01); *B60L 2240/423* (2013.01); *Y02T 10/7005* (2013.01); *Y02T 10/7233* (2013.01); *Y02T 10/642* (2013.01); *Y02T 10/70* (2013.01)

USPC ................. 701/50; 37/466; 56/10.5

(56) References Cited

U.S. PATENT DOCUMENTS

| | | |
|---|---|---|
| 2007/0156319 A1* | 7/2007 | Matsuda et al. ............. 701/50 |
| 2010/0170227 A1* | 7/2010 | Tsukada et al. ............. 60/286 |
| 2010/0270095 A1* | 10/2010 | Shono et al. ............ 180/65.29 |
| 2011/0071739 A1* | 3/2011 | Sano et al. .................. 701/50 |
| 2011/0077825 A1* | 3/2011 | Sano ............................ 701/42 |
| 2011/0167811 A1* | 7/2011 | Kawaguchi et al. ......... 60/395 |
| 2012/0082536 A1* | 4/2012 | Kawashima et al. ....... 414/694 |
| 2012/0245806 A1* | 9/2012 | Kawasaki et al. .......... 701/50 |
| 2013/0045072 A1* | 2/2013 | Jensen ....................... 414/699 |

FOREIGN PATENT DOCUMENTS

| | | |
|---|---|---|
| JP | 2010-121328 A | 6/2010 |
| JP | 2011-078277 A | 4/2011 |

* cited by examiner

ELECTROMOTIVE DRIVE DEVICE FOR CONSTRUCTION MACHINE

TECHNICAL FIELD

The present invention relates to a construction machine such as an electromotive hydraulic excavator or a hybrid hydraulic excavator, and particularly to an electromotive drive device for a construction machine, which is equipped with a motor-generator that drives a hydraulic pump for supplying pressurized fluid to a plurality of hydraulic actuators, and an electric power storage device that performs a transfer of power to and from the motor-generator.

BACKGROUND ART

A mini-excavator (i.e., a hydraulic excavator having an operating mass of less than 6 tons) that is one example of a construction machine is generally equipped with a lower track structure, an upper swing structure swingably provided on the lower track structure, and an articulated work device provided elevatably relative to the upper swing structure and including a boom, an arm and a bucket. This mini-excavator is equipped with, for example, a hydraulic pump, a plurality of hydraulic actuators (in detail, e.g., a boom hydraulic cylinder, an arm hydraulic cylinder and a bucket hydraulic cylinder, etc.), a plurality of directional control valves which respectively control the flow of pressurized fluid from the hydraulic pump to the plurality of hydraulic actuators, and operating means (in detail, e.g., a plurality of operating devices each of which outputs pilot pressure corresponding to the position of operation of each control lever) which respectively operate the plurality of directional control valves.

There has recently been proposed an electric motor-driven mini-excavator equipped with an electric motor (motor-generator) instead of an engine as a drive source of the hydraulic pump because it has the advantage of greatly reducing even noise and vibrations without discharging exhaust emissions (refer to, for example, Patent Document 1).

PRIOR ART LITERATURE

Patent Document

Patent Document 1: JP-2010-121328-A

SUMMARY OF THE INVENTION

Problems to be Solved by the Invention

In the above-described electric motor-driven mini-excavator, there is known as a power source of the electric motor, one equipped with an electric power storage device composed of a plurality of batteries. This storage-device mounted electric motor-driven mini-excavator needs not to be always connected to an external power supply using a power cable. The mini-excavator has the advantage that when it is not connected to the external power supply using the power cable upon work of the mini-excavator, for example, its movement and swing operation are not limited. There is, however, a limit to the number of batteries mountable to the mini-excavator, in turn, the storage capacity of the electric power storage device. Described in detail, for example, in a mini-excavator called a rear ultra-small turning type or an ultra-small turning type, the size of turning radius at the rear end of the upper swing structure or in the entirety of the upper swing structure are restricted. The upper swing structure is provided with a cab or the like at which an operator boards and further equipped with a hydraulic device including a plurality of directional control valves, a hydraulic pump and an operating oil tank. Therefore, the space of each battery mountable to the upper swing structure is limited to avoid compromising the visibility of the operator. There is a limit to the number of the batteries mountable to the upper swing structure. Accordingly, there is a limit to the storage capacity of the electric power storage device mounted to the mini-excavator. The operating time of the mini-excavator has been limited where it is not connected to the external power supply using the power cable.

An object of the present invention is to provide an electromotive drive device for a construction machine, which enables an operating time restricted by an electric power storage device mounted to the construction machine to be longer than conventional by the effect of power generation by a motor-generator at the stage of transition of the construction machine from an operational state to a halt state.

Means for Solving the Problems (1) In order to achieve the above object, the present invention provides an electromotive drive device for a construction machine, which is equipped with an electric power storage device; a motor-generator which performs the transfer of power to and from the electric power storage device; a hydraulic pump driven by the motor-generator, a plurality of hydraulic actuators; a plurality of directional control valves which respectively control the flow of pressurized fluid from the hydraulic pump to the plurality of hydraulic actuators; and a plurality of operating means which respectively operate the plurality of directional control valves. The electromotive drive device has operation detecting means which detects the presence or absence of operations of the plurality of directional control valves, and idle control means which when a first time set in advance has elapsed in a state in which the plurality of directional control valves are all not operated, decelerates the motor-generator controlled at a set revolution speed set in advance in such a manner that the plurality of hydraulic actuators are drivable before the elapse of the first time, to a low revolution speed set in advance lower than the set revolution speed. When the idle control means decelerates the motor-generator from the set revolution speed suitable for work to the low revolution speed at the stage of transition of the construction machine from an operational state to a halt state, the idle control means performs regenerative control to convert an inertial force of a rotor of the motor-generator to power and charge the electric power storage device.

(2) In the above (1), preferably, the electromotive drive device has first stop control means which stops the motor-generator when the motor-generator is decelerated to the low revolution speed and thereafter a second time set in advance further has elapsed in the state in which the plurality of directional control valves are not operated. When the motor-generator is stopped from a driven state thereof at the low revolution speed, the first stop control means performs regenerative control to convert the inertial force of the rotor of the motor-generator to power and charge the electric power storage device.

(3) In the above (1) or (2), preferably, the electromotive drive device has a gate lock lever which is provided at a platform and manipulated to a prohibition release position and a prohibition position, prohibiting means which prohibits the operation of each of the plurality of directional control valves when the gate lock lever is manipulated to the prohibition position, and second stop control means which stops the motor-generator when the gate lock lever is manipulated to the prohibition position. When the motor-generator is stopped, the second stop control means performs regenerative control to convert the inertial force of the rotor of the motor-generator to power and charge the electric power storage device.

(4) In order to achieve the above object, the present invention provides an electromotive drive device for a construction machine, which is equipped with an electric power storage device; a motor-generator which performs the transfer of power to and from the electric power storage device; a hydraulic pump driven by the motor-generator; a plurality of hydraulic actuators; a plurality of directional control valves which respectively control the flow of pressurized fluid from the hydraulic pump to the plurality of hydraulic actuators; and a plurality of operating means which respectively operate the plurality of directional control valves. The electromotive drive device has operation detecting means which detects the presence or absence of operations of the plurality of directional control valves, and stop control means which when a predetermined time set in advance has elapsed in a state in which the plurality of directional control valves are all not operated, stops the motor-generator controlled at a set revolution speed set in advance in such a manner that the plurality of hydraulic actuators are drivable before the elapse of the predetermined time. When the stop control means stops the motor-generator from a driven state thereof at the set revolution speed suitable for work at the stage of transition of the construction machine from an operational state to a halt state, the stop control means performs regenerative control to convert an inertial force of a rotor of the motor-generator to power and charge the electric power storage device.

(5) In order to achieve the above object, the present invention provides an electromotive drive device for a construction machine, which is equipped with an electric power storage device; a motor-generator which performs the transfer of power to and from the electric power storage device; a hydraulic pump driven by the motor-generator; a plurality of hydraulic actuators; a plurality of directional control valves which respectively control the flow of pressurized fluid from the hydraulic pump to the plurality of hydraulic actuators; and a plurality of operating means which respectively operate the plurality of directional control valves. The electromotive drive device includes a gate lock lever which is provided at a platform and manipulated to a prohibition release position and a prohibition position; prohibiting means which prohibits the operation of each of the plurality of directional control valves when the gate lock lever is manipulated to the prohibition position; and stop control means which when the gate lock lever is manipulated from the prohibition release position to the prohibition position, stops the motor-generator controlled at a set revolution speed set in advance in such a manner that the plurality of hydraulic actuators are drivable. When the stop control means stops the motor-generator from a driven state thereof at the set revolution speed suitable for work at the stage of transition of the construction machine from an operational state to a halt state, the stop control means performs regenerative control to convert an inertial force of a rotor of the motor-generator to power and charge the electric power storage device.

Effects of the Invention

According to the present invention, the operating time of a construction machine can be lengthened by performing regenerative control to convert an inertial force of a rotor of a motor-generator to power and charge an electric power storage device when the motor-generator is decelerated or stopped at the stage of transition of the construction machine from an operational state to a halt state.

MODE FOR CARRYING OUT THE INVENTION

One embodiment of the present invention will be described based on FIGS. 1 through 6.

Figure 1:
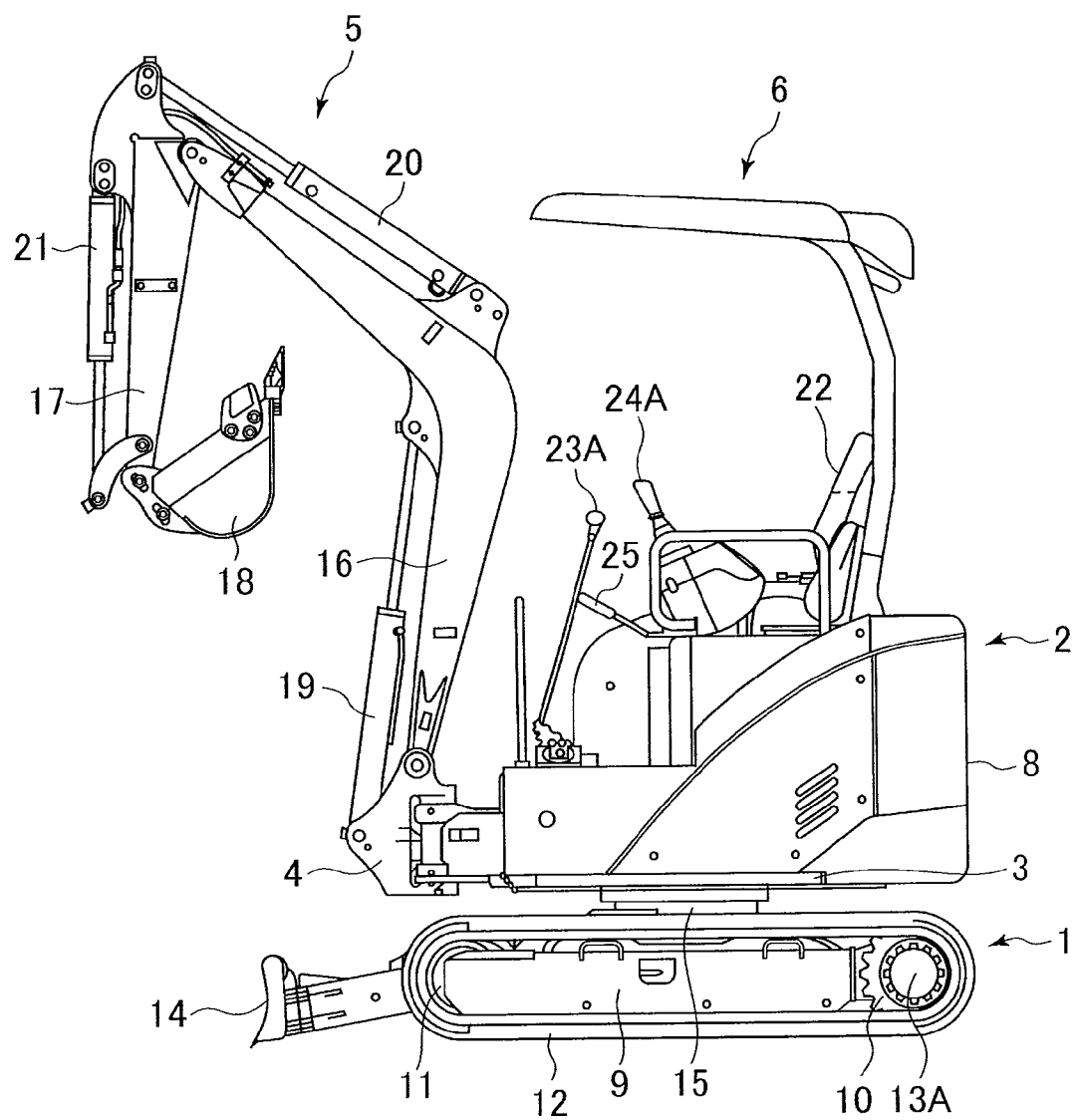
FIG. 1 is a side view showing a whole structure of an electric motor-driven mini-excavator according to one embodiment of the present invention.

FIG. 1 is a side view showing a whole structure of an electric motor-driven mini-excavator according to the present embodiment. Incidentally, subsequently, the front side (left side in FIG. 1), the back side (right side in FIG. 1), the left side (near side to the sheet in FIG. 1) and the right side (deep side to the sheet in FIG. 1) of an operator where the operator takes a cab seat in a state in which the motor-driven mini-excavator is shown in FIG. 1, will be simply called "front side", "back side", "left side" and "right side" respectively.

In FIG. 1, the motor-driven mini-excavator is equipped with a crawler type lower track structure 1, an upper swing structure 2 swingably provided on the lower track structure 1, a swing frame 3 that forms a basic lower structure of the upper swing structure 2, a swing post 4 rotatably provided in the horizontal direction on the front side of the swing frame 3, an articulated work device 5 rotatably (elevatably) coupled to the swing post 4 in the vertical direction, a canopy type cab 6 provided on the swing frame 3, and a battery mounting part 8 that accommodates an electric power storage device 7 (refer to FIGS. 2 and 3 to be described later) provided on the rear side on the swing frame 3 and composed of a plurality of batteries (e.g., lithium batteries). Incidentally, in the present embodiment, a power supply socket (not shown) capable of attaching and detaching a cable extending from an external power supply is provided laterally of the upper swing structure 2.

The lower track structure 1 is equipped with a track frame 9 shaped substantially in the form of an H as seen from above, right and left drive wheels 10 rotatably supported at the neighborhood of the rear ends of both right and left sides of the track frame 9, right and left idler wheels (idlers) 11 rotatably supported at the neighborhood of the front ends of both right and left sides of the track frame 9, and right and left crawlers 12 mounted over the right and left drive wheels 10 and idlers 11 respectively. The left drive wheel 10 (i.e., left crawler 12) is rotated by the driving of a left traveling hydraulic motor 13A. The right drive wheel 10 (i.e., right crawler 12) is rotated by the driving of a right traveling hydraulic motor 13B (not shown).

An earth moving blade 14 is vertically movably provided on the front side of the track frame 9. This blade 14 is to move up and down by extension/driving of a blade hydraulic cylinder (not shown).

A swing wheel 15 is provided at the central part of the track frame 9. The swing frame 3 is swingably provided through the swing wheel 15. The swing frame 3 (i.e., the upper swing structure 2) is swung by the driving of a swing hydraulic motor (not shown).

The swing post 4 is horizontally rotatably provided on the front side of the swing frame 3 and turned horizontally by extension and driving of a swing hydraulic cylinder (not shown). Thus, the work device 5 is to be swung from side to side.

The work device 5 is equipped with a boom 16 vertically rotatably coupled to the swing post 4, an arm 17 vertically rotatably coupled to the boom 16, and a bucket 18 vertically rotatably coupled to the arm 17. The boom 16, the arm 17 and the bucket 18 are turned vertically by a boom hydraulic cylinder 19, an arm hydraulic cylinder 20 and a bucket hydraulic cylinder 21, respectively. Incidentally, the bucket 18 can be replaced with, for example, an attachment (not shown) in which an option hydraulic actuator has been built.

The cab 6 is provided with a cab seat (seat) 22 on which an operator sits. Right and left traveling control levers 23A and 23B, which are hand- or foot-operable and give instructions as to the operations of the right and left swing hydraulic motors 13A and 13B respectively by manipulating them forward and backward, are provided in front of the cab seat 22. An option control pedal (not shown) which gives instructions as to the operation of the option hydraulic actuator by manipulating it in the horizontal direction, is further provided at the left foot part of the left traveling control lever 23A. A swing control pedal (not shown) which gives instructions as to the operation of the swing hydraulic cylinder by manipulating it in the horizontal direction, is further provided at the right food part of the right traveling control lever 23B.

A cross-operated arm/swing control lever 24A which gives instructions as to the operation of the arm hydraulic cylinder 20 by manipulating it forward and backward and gives instructions as to the operation of the swing hydraulic motor by manipulating it leftward and rightward, is provided on the left side of the cab seat 22. A cross-operated boom/bucket control lever 24B (refer to FIG. 2 to be described later) which gives instructions as to the operation of the boom hydraulic cylinder 19 by manipulating it forward and backward and gives instructions as to the operation of the bucket hydraulic cylinder 21 by manipulating it leftward and rightward, is provided on the right side of the cab seat 22. A blade control lever (not shown) which gives instructions as to the operation of the blade hydraulic cylinder by manipulating it forward and backward, is provided on the right side of the cab seat 22.

A gate lock lever 25 manipulated to a prohibition release position (in detail, descent position to prevent the operator from getting on/off) and a prohibition position (in detail, ascent position to allow the operator to get on/off) is provided on the left side (in other words, a platform of the cab 6) of the cab seat 22.

A dial 26 (refer to FIG. 3 to be described later) and the like are provided on the right side of the cab seat 22. With the rotational operation of the dial 26, the dial 26 enables a standard revolution speed-of a motor-generator 27 (refer to FIGS. 2 and 3) described later to be instructed within a predetermined range (in detail, it includes a rated revolution speed, e.g., $N_H$=2000 rpm to $N_L$=1500 rpm) and outputs a signal corresponding to its operation position. The standard revolution speed is a set revolution speed at which the above hydraulic actuator is drivable, e.g., a set revolution speed at which the torque for performing excavating by the work device 5 can sufficiently be obtained. Incidentally, the motor-generator 27 combines both functions of a motor and a generator.

Figure 2:
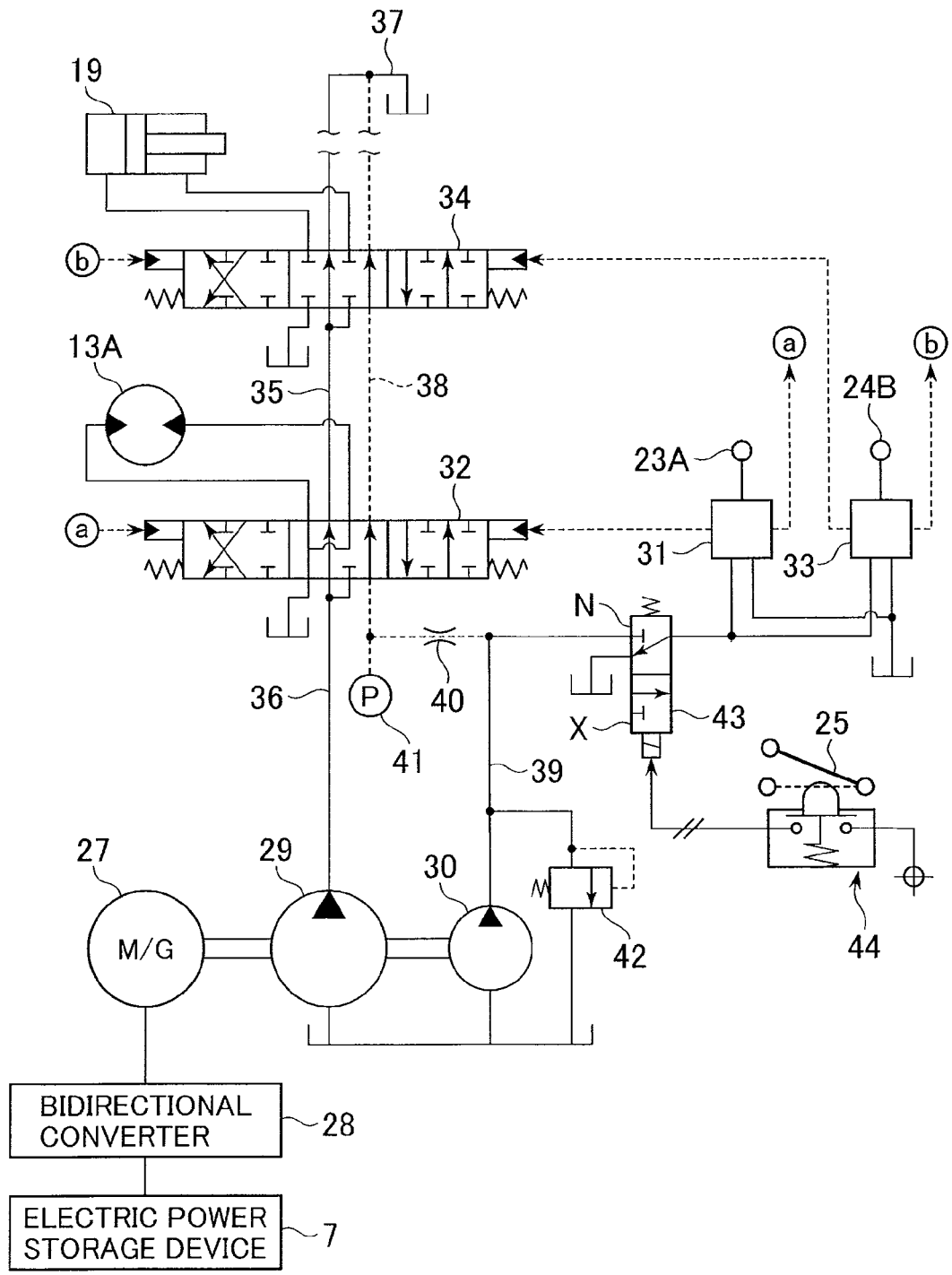
FIG. 2 is a diagram illustrating a construction of an electromotive drive device in the one embodiment of the present invention.

FIG. 2 is a diagram showing a construction of the electromotive drive device provided in the above motor-driven mini-excavator. Incidentally, in FIG. 2, a construction related to the left traveling hydraulic motor 13A and the boom hydraulic cylinder 19 is shown as a representative.

In FIG. 2, there are provided the electric power storage device (battery device) 7, a motor-generator (M/G) 27 which performs the transfer of power to and from the electric power storage device 7 through a bidirectional converter 28, a hydraulic pump 29 and a pilot pump 30 both driven by the motor-generator 27, a hydraulic pilot type operating device (remote operating device) 31 equipped with the above left traveling control lever 23A, and a left traveling directional control valve 32 which controls the flow of pressurized fluid from the hydraulic pump 29 to the left traveling hydraulic motor 13A according to the forward and backward operations of the left traveling control lever 23A. There are also provided a hydraulic pilot type operating device (remote operating device) 33 equipped with the above bucket/boom control lever 24B, and a boom directional control valve 34 which controls the flow of pressurized fluid from the hydraulic pump 29 to the boom hydraulic cylinder 19 according to the forward and backward operations of the bucket/boom control lever 24B. Incidentally, although not illustrated in the drawing, a construction related to the right traveling hydraulic motor 13B, arm hydraulic cylinder 20, bucket hydraulic cylinder 21, swing hydraulic motor, swing hydraulic cylinder, and blade hydraulic cylinder is also almost the same as above.

The left traveling directional control valve 32 and the boom directional control valve 34, and the like (in detail, a right traveling directional control valve, an arm directional control valve, a bucket directional control valve, a turning directional control valve, a swing directional control valve and a blade directional control valve all of which are not shown in the drawing) are of a center bypass type and respectively have center bypass passages located on a center bypass line 35. The center bypass passages of the respective directional control valves are connected in series to the center bypass line 35. The center bypass passages communicate with one another where the spools of the respective directional control valves are respectively in a neutral position, and are cut off when they are switched to changeover positions on the left or right side in FIG. 2. The upstream side of the center bypass line 35 is connected to a delivery line 36 of the hydraulic pump 29. The downstream side of the center bypass line 35 is connected to a tank line 37.

The left traveling directional control valve 32 and the boom directional control valve 34, and the like respectively have signal paths located on a hydraulic signal line 38. That is, the signal paths of the respective directional control valves are connected in series with the hydraulic signal line 38. The signal paths are in communication where the spools of the respective directional control valves are respectively in the neutral position, and are cut off when they are switched to the changeover positions on the left or right side in FIG. 2. The upstream side of the hydraulic signal line 38 is connected so as to branch off from a delivery line 39 of the pilot pump 30. The downstream side of the hydraulic signal line 38 is connected to the tank line 37. A fixed restrictor 40 is provided on the upstream side of the directional control valve 32 lying in the highest upstream in the hydraulic signal line 38. A pressure switch 41 (operation detecting means) is provided between the fixed restrictor 40 and the directional control valve 32. The pressure switch 41 introduces fluid pressure on the upstream side of the directional control valve 32 and closes a contact point where the fluid pressure reaches a threshold vale set in advance. Thus, it detects whether any of all the directional control valves is operated, and outputs an ON signal where any of them is operated.

The left traveling directional control valve 32 is remote-controlled by pilot pressure delivered from the operating device 31. The operating device 31 has the above-described left traveling control lever 23A and a pair of pressure reducing valves (not shown) which generates pilot pressures according to the forward and backward operations of the control lever 23A with the delivery pressure of the pilot pump 30 as original pressure. For example, when the control lever 23A is operated from the neutral position to the front side, the pilot pressure generated by one of the pair of pressure reducing valves is outputted to its corresponding pressure receiving part on the right side in FIG. 2, of the left traveling directional control valve 32 according to an operation amount of the control lever 23A, so that the left traveling directional control valve 32 is switched to the changeover position on the right side in FIG. 2. Thus, the left traveling hydraulic motor 13A is rotated forward, and the left drive wheel 10 and crawler 12 are rotated forward. On the other hand, for example, when the control lever 23A is operated from the neutral position to its rear side, the pilot pressure generated by the other thereof is outputted to its corresponding pressure receiving part on the left side in FIG. 2, of the left traveling directional control valve 32 according to an operation amount of the control lever 23A, so that the left traveling directional control valve 32 is switched to the changeover position on the left side in FIG. 2. Thus, the left traveling hydraulic motor 13A is rotated backward, and the left drive wheel 10 and crawler 12 are rotated backward.

The boom directional control valve 34 is remote-controlled by pilot pressure delivered from the operating device 33. The operating device 33 has the boom/bucket control lever 24B, a pair of pressure reducing valves (not shown) which generates pilot pressures according to the forward and backward operations of the control lever 24B with the delivery pressure of the pilot pump 30 as original pressure, etc. For example, when the control lever 24B is operated from the neutral position to the front side, the pilot pressure generated by one of the pair of pressure reducing valves is outputted to its corresponding pressure receiving part on the right side in FIG. 2, of the boom directional control valve 34 according to an operation amount of the control lever 24B, so that the boom directional control valve 34 is switched to the changeover position on the right side in FIG. 2. Thus, the boom hydraulic cylinder 19 is contracted and hence the boom 16 is lowered. On the other hand, for example, when the control lever 24B is operated to the rear side, the pilot pressure generated by the other thereof is outputted to its corresponding pressure receiving part on the left side in FIG. 2, of the boom directional control valve 34 according to an operation amount of the control valve 24B, so that the boom directional control valve 34 is switched to the changeover position on the left side in FIG. 2. Thus, the boom hydraulic cylinder 19 expands and hence the boom 16 is elevated.

The delivery line 39 of the pilot pump 30 is provided with a pilot release valve 42 which holds the delivery pressure of the pilot pump 30 constant. Also the delivery line 39 of the pilot pump 30 is provided with a lock valve 43 (prohibiting means). The lock valve 43 is switched according to the operation of the above-described gate lock lever 25. Described in detail, a lock switch 44 changed over according to the position of the operation of the gate lock lever 25 is provided. When the gate lock lever 25 is in the prohibition release position (descent position), the lock switch 44 is brought to a closed state (ON). When the gate lock lever 25 is in the prohibition position (ascent position), the lock switch 44 is brought to an open state (OFF). When the lock switch 44 is brought to the closed state, a solenoid part of the lock valve 43 is energized through the lock switch 44 so that the lock valve 43 is switched to a changeover position X on the lower side in FIG. 2. Thus, it allows the delivery line 39 of the pilot pump 30 to communicate to introduce the delivery pressure of the pilot pump 30 into the operating devices 31 and 33 and the like. On the other hand, when the lock switch 44 is brought to the open state, the solenoid part of the lock valve 43 is de-energized so that the lock valve 43 is switched to a neutral position N on the upper side in FIG. 2 by the urging force of a spring. This thus allows the delivery line 39 of the pilot pump 30 to cut off and causes the primary side of the operating devices 31 and 33 and the like to communicate with a tank. Accordingly, the pilot pressures to all the directional control valves reach the pressure of the tank even if the operating devices 31 and 33 and the like are operated, so that the operations of the operating devices 31 and 33 and the like are respectively brought to a prohibited state. As a result, the stop states of all the hydraulic actuators are maintained.

Figure 3:
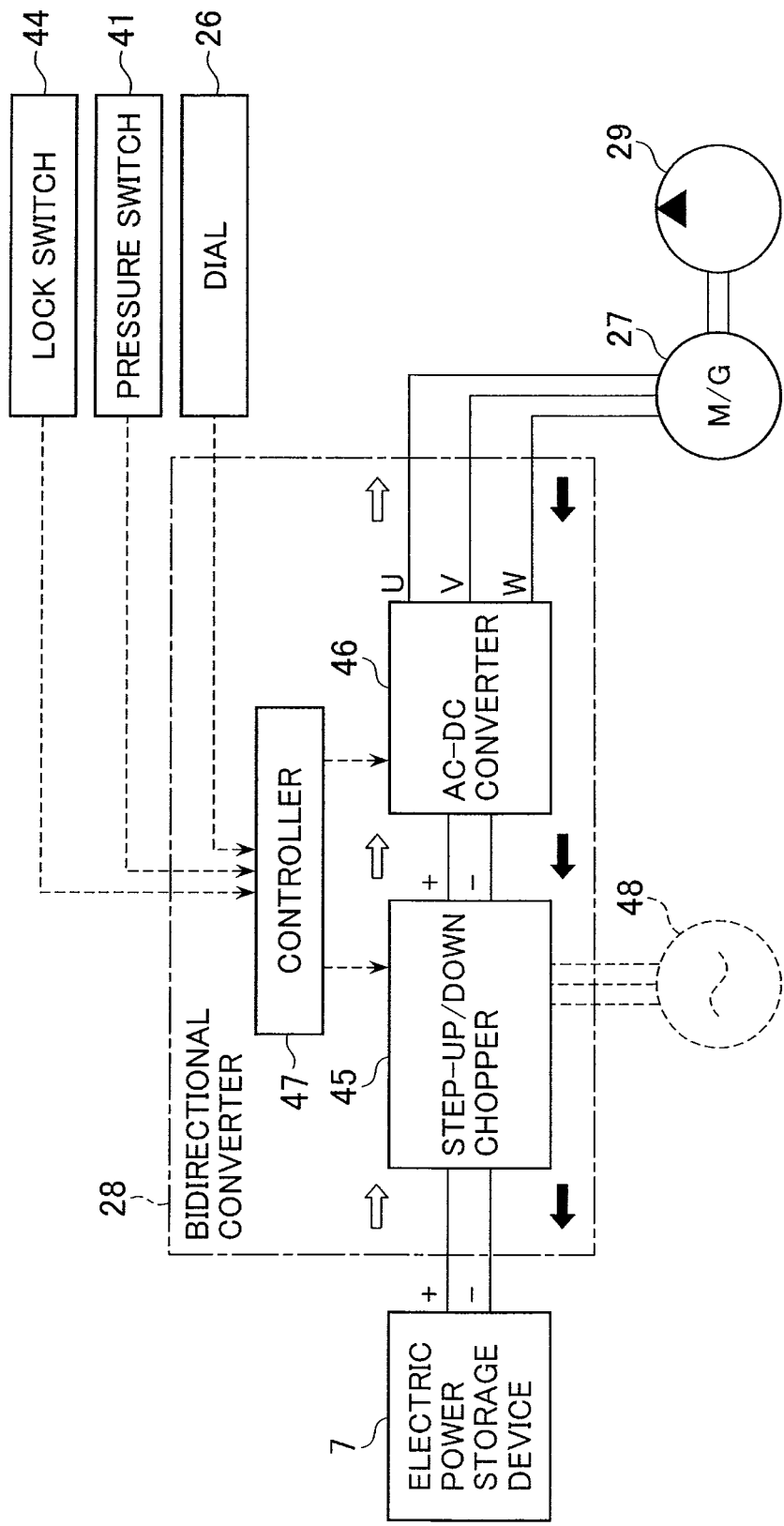
FIG. 3 is a block diagram depicting a bidirectional converter in the one embodiment of the present invention along with its related devices.

FIG. 3 is a block diagram showing the bidirectional converter 28 corresponding to an essential part of the present embodiment along with its related devices.

In FIG. 3, the bidirectional converter 28 is equipped with a step-up/down chopper 45, an AC-DC converter 46 and a controller 47. Although not illustrated in detail, the step-up/down chopper 45 has a step-up circuit, a step-down circuit, a rectifying circuit, and switches provided among those circuits. The controller 47 inputs signals delivered from the above-described lock switch 44, pressure switch 41 and dial 26 or the like therein and controls the step-up/down chopper 45 and the AC-DC converter 46 in response to these signals. Thus, the controller 47 switches the motor-generator 27 to a standard operation in which it is driven at a standard revolution speed set by the dial 26, an idle operation in which it is driven at an idle revolution speed $N_I$ (described in detail, in the present embodiment, it is a low revolution speed at which the above-described hydraulic actuator is undrivable, e.g., 300 rpm) set in advance lower than the minimum standard revolution speed $N_L$ settable by the dial 26, or a stop.

This will be explained in detail. The controller 47 determines based on the signal delivered from the lock switch 44 whether the gate lock lever 25 has been manipulated to the prohibition position or the prohibition release position. For example, when the controller determines that the gate lock lever 25 has been manipulated from the prohibition release position to the prohibition position, the controller 47 stops the motor-generator 27. On the other hand, for example, when it is determined that the gate lock lever 25 has been manipulated from the prohibition position to the prohibition release position, the controller 47 controls the motor-generator 27 so as to switch it from the stop state to the idle operation. Also the controller 47 determines based on the signal delivered from the pressure switch 41 whether all the directional control valves are respectively in a non-operated state. For example, when any of the directional control valves is operated during the idle operation of the motor-generator 27 or its stop, the controller 47 switches the motor-generator 47 to the standard operation. On the other hand, for example, when X seconds (a few seconds) set in advance have elapsed in a state in which all the directional control valves are not operated during the standard operation of the motor-generator 27, the controller 47 switches the motor-generator 27 to the idle operation. Further, for example, when Y seconds (in the present embodiment, however, Y>X and a few seconds) set in advance have elapsed in a state in which all the directional control valves are not operated during the idle operation of the motor-generator 27, the controller 47 controls the motor-generator 27 to stop its operation.

A large feature of the present embodiment lies in that the controller 47 causes the motor-generator 27 as a motor during the standard operation or idle operation of the motor-generator 27 and that when the controller 47 switches the motor-generator 27 from the standard operation to the idle operation (in other words, it decelerates the motor-generator 27 from the standard revolution speed to the idle revolution speed) or causes the motor-generator 27 to stop, the controller 47 operates the motor-generator 27 as a generator (regenerative brake).

Figure 4:
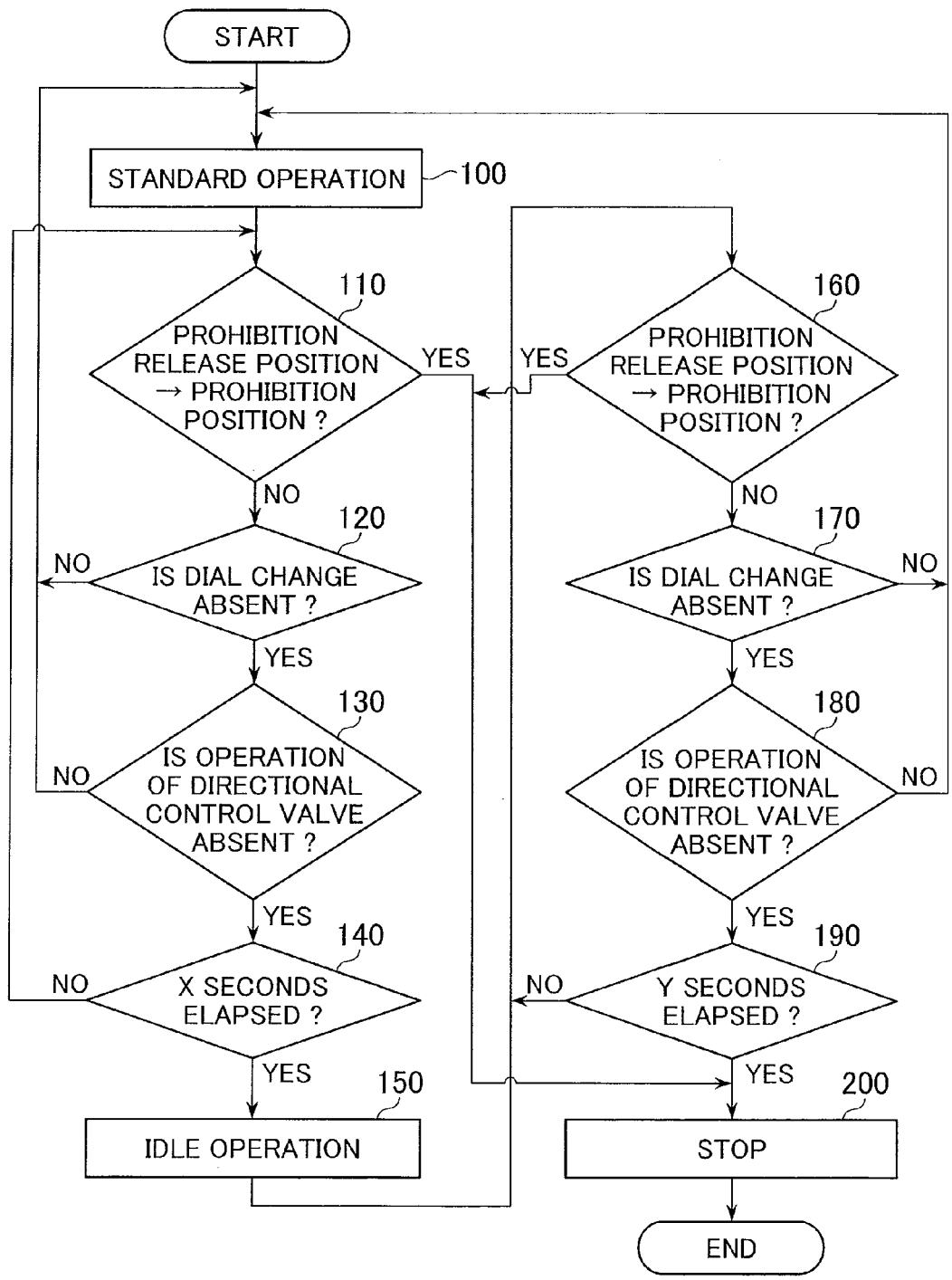
FIG. 4 is a flowchart showing the contents of control processing of a controller of the bidirectional converter in the one embodiment of the present invention.

A control procedure of the above-described controller 47 will next be explained. FIG. 4 is a flowchart showing the contents of control processing of the controller 47.

In FIG. 4, for example, when the gate lock lever 25 is manipulated to the prohibition release position and any of the directional control valves is operated by the control lever, the controller 47 proceeds to Step 100, where it performs control on the standard operation of the motor-generator 27. Described in detail, the controller 47 outputs a drive command to the step-up/down chopper 45 and the AC-DC converter 46. Also the controller 47 computes a voltage to be applied to the motor-generator 27, based on a difference between the standard revolution speed set by the dial 26 and the actual revolution speed (although not illustrated in detail, e.g., an actual revolution speed detected by a revolution speed sensor or an actual revolution speed computed based on the results of detection of a position sensor that detects a magnetic pole position of the motor-generator 27 and a current sensor that detects the primary current of the motor-generator 27) of the motor-generator 27 or the like, and outputs it to the AC-DC converter 46 as a voltage command. Then, the step-up/down chopper 45 steps up the voltage of DC power delivered from the electric power storage device 7 in response to the drive command and supplies it to the AC-DC converter 46. The AC-DC converter 46 generates AC power on the basis of the DC power delivered from the step-up/down chopper 45 in response to the drive command and the voltage command and applies the same to the motor-generator 27. This thus results in the flow of such electricity as indicated by open arrows in FIG. 3 described above. The motor-generator 27 is driven at the standard revolution speed.

The controller 47 proceeds to Step 110, where it determines based on the signal delivered from the lock switch 44 whether the gate lock lever 25 has been manipulated from the prohibition release position to the prohibition position. For example, when it is determined that the gate lock lever 25 has not been operated to the prohibition position, the determination of Step 110 is not satisfied and hence the controller 47 proceeds to Step 120. At Step 120, the controller 47 determines based on the signal delivered from the dial 26 whether no change occurs in the position of operation of the dial 26. For example, when a change has occurred in the operation position of the dial 26, the determination of Step 120 is not satisfied, and the controller 47 returns to the above Step 100, where the procedure similar to the above is performed. On the other hand, for example, when no change occurs in the operation position of the dial 26, the determination of Step 120 is satisfied and the controller 47 proceeds to Step 130.

At Step 130, the controller 47 determines based on the signal delivered from the pressure switch 41 whether all the directional control valves are respectively in a non-operated state. For example, when any of the directional control valves is operated, the determination of Step 130 is not satisfied and hence the controller 47 returns to the above Step 100, where the procedure similar to the above is performed. On the other hand, for example, when all the directional control valves are respectively in the non-operated state, the determination of Step 130 is satisfied and hence the controller 47 proceeds to Step 140. At Step 140, the controller 47 determines whether X seconds have elapsed in the state in which all the directional control valves are not being operated. While X seconds do not elapse in the state in which all the directional control valves are not being operated, the determination of Step 140 is not satisfied and hence the controller 47 returns to the above Step 110, where the procedure similar to the above is repeated.

Then, the determinations of Steps 110 through 130 are repeatedly performed. For example, if X seconds have elapsed in the state in which all the directional control valves are not being operated, the determination of Step 140 is satisfied. Thus, the controller 47 determines that the miniexcavator is at the stage of transiting from an operational state to a halt state, and proceeds to Step 150, where the controller 47 performs switching to the idle operation control of the motor-generator 27. Described in detail, the controller 47 first outputs a regeneration command to the step-up/down chopper 45 and the AC-DC converter 46 until the motor-generator 27 is brought from the standard revolution speed to the idle revolution speed. Then, in response to the regeneration command, the AC-DC converter 46 converts an inertial force of a rotor of the motor-generator 27 to AC power and converts the AC power to DC power. The step-up/down chopper 45 boosts the voltage of the DC power delivered from the AC-DC converter 46 in response to the regeneration command and supplies the same to the electric power storage device 7. This thus results in the flow of such electricity as indicated by black arrows in the drawing and hence the electric power storage device 7 is charged.

Thereafter, when the drive-generator 27 is brought to the idle revolution speed, the controller 47 outputs a drive command to the step-up/down chopper 45 and the AC-DC converter 46. The controller 47 computes a voltage applied to the motor-generator 27, based on the difference between the idle revolution speed and the actual revolution speed of the motor-generator 27 or the like and outputs the voltage to the AC-DC converter 46 as a voltage command. Then, the step-up/down chopper 45 steps up the voltage of DC power delivered from the electric power storage device 7 in response to the drive command and supplies it to the AC-DC converter 46. In response to the drive command and the voltage command, the AC-DC converter 46 generates AC power on the basis of the DC power delivered from the step-up/down chopper 45 and applies the same to the motor-generator 27. This thus results in the flow of such electricity as indicated by the open arrows in FIG. 3 described above and hence the motor-generator 27 is driven at the idle revolution speed.

The controller 47 proceeds to Step 160, where it determines based on the signal delivered from the lock switch 44 whether the gate lock lever 25 has been manipulated from the prohibition release position to the prohibition position. For example, when it is determined that the gate lock lever 25 has not been operated to the prohibition position, the determination of Step 160 is not satisfied and hence the controller 47 proceeds to Step 170. At Step 170, the controller 47 determines based on the signal delivered from the dial 26 whether no change occurs in the position of operation of the dial 26. For example, when a change has occurred in the operation position of the dial 26, the determination of Step 170 is not satisfied, and the controller 47 returns to the above Step 100, where the controller 47 performs switching to the standard operation control of the motor-generator 27. On the other hand, for example, when no change occurs in the operation position of the dial 26, the determination of Step 170 is satisfied and the controller 47 proceeds to Step 180.

At Step 180, the controller 47 determines based on the signal delivered from the pressure switch 41 whether all the directional control valves are respectively in a non-operated state. For example, when any of the directional control valves is operated, the determination of Step 180 is not satisfied. Hence, the controller 47 determines that the mini-excavator is at the stage of transiting from a halt state to an operational state, and returns to the above Step 100, where the controller 47 performs switching to the standard operation control of the motor-generator 27. On the other hand, for example, when all the directional control valves are respectively in the non-operated state, the determination of Step 180 is satisfied and hence the controller 47 proceeds to Step 190. At Step 190, the controller 47 determines whether Y seconds have elapsed in the state in which all the directional control valves are not being operated. While Y seconds do not elapse in the state in which all the directional control valves are not being operated, the determination of Step 190 is not satisfied and hence the controller 47 returns to the above Step 160, where the procedure similar to the above is repeated.

Then, the determinations of Steps 160 through 180 are repeatedly performed. For example, if Y seconds have elapsed in the state in which all the directional control valves are not being operated, the determination of Step 190 is satisfied and hence the controller 47 proceeds to Step 200, where the controller 47 performs control on the halt of the motor-generator 27. Described in detail, the controller 47 outputs a regeneration command to the step-up/down chopper 45 and the AC-DC converter 46 until the motor-generator 27 stops. Then, in response to the regeneration command, the AC-DC converter 46 converts an inertial force of the rotor of the motor-generator 27 to AC power and converts the AC power to DC power. The step-up/down chopper 45 boosts the voltage of the DC power delivered from the AC-DC converter 46 in response to the regeneration command and supplies the same to the electric power storage device 7. This thus results in the flow of such electricity as indicated by black arrows in the drawing, and hence the electric power storage device 7 is charged.

For example, when it is determined at the above Step 110 that the gate lock lever 25 has been operated from the prohibition release position to the prohibition position, the determination of Step 110 is satisfied. Thus, the controller 47 determines that the mini-excavator is at the stage of transiting from the operational state to the halt state. Then, the controller 47 proceeds to the above Step 200, where it performs control on the stop of the motor-generator 27. For example, when it is determined at the above Step 160 that the gate lock lever 25 has been manipulated from the prohibition release position to the prohibition position, the determination of Step 160 is satisfied and hence the controller 47 proceeds to the above Step 200, where is performs control on the stop of the motor-generator 27. Even in these times, this results in the flow of such electricity as indicated by the black arrows in the drawing as with the above. The electric power storage device 7 is thus charged.

Incidentally, in the above, the above Steps 130 through 150 conducted by the controller 47 of the bidirectional converter 28 configure idle control means, as claimed in claims, which when a first time set in advance has elapsed in a state in which a plurality of directional control valves have all not been operated, decelerates a motor-generator that has been controlled at a set revolution speed set in advance in such a manner that a plurality of hydraulic actuators are drivable before the elapse of the first time, to a low revolution speed set in advance lower than the set revolution speed. The above Steps 180 through 200 conducted by the controller 47 of the bidirectional converter 28 configure first stop control means which when the motor-generator is decelerated to the low revolution speed and thereafter a second time set in advance further has elapsed in the state in which the plurality of directional valves have all not been operated, stops the motor-generator. The above Steps 110, 160 and 200 conducted by the controller 47 of the bidirectional converter 28 configure second stop control means which stops the motor-generator when the gate lock lever is manipulated to the prohibition position. In particular, the above Steps 110 and 200 conducted by the controller 47 of the bidirectional converter 28 configure stop control means which when the gate lock lever is manipulated from the prohibition release position to the prohibition position, stops the motor-generator that has been controlled at a predetermined set revolution speed in such a manner that a plurality of hydraulic actuators are drivable.

Referring back to FIG. 3 described above, the bidirectional converter 28 intervenes between a commercial power source 48 (external power supply) and the electric power storage device 7 where the cable extending from the commercial power source 48 is connected to a power supply port. There is provided a charging switch (not shown) that enables instructions as to the start/end of charging by the external power supply during the stop of the motor-generator 27. In response to a charge start instruction signal delivered from the charging switch, the controller 47 performs control to supply power delivered from the commercial power source 48 to the electric power storage device 7 and charge the electric power storage device 7. Described in detail, in response to a command given from the controller 47, the step-up/down chopper 45 converts AC power delivered from the commercial power source 48 to DC power and steps down its voltage, followed by supply to the electric power storage device 7.

The operation and operative effects of the present embodiment will next be described using FIGS. 5 and 6.

Figure 5:
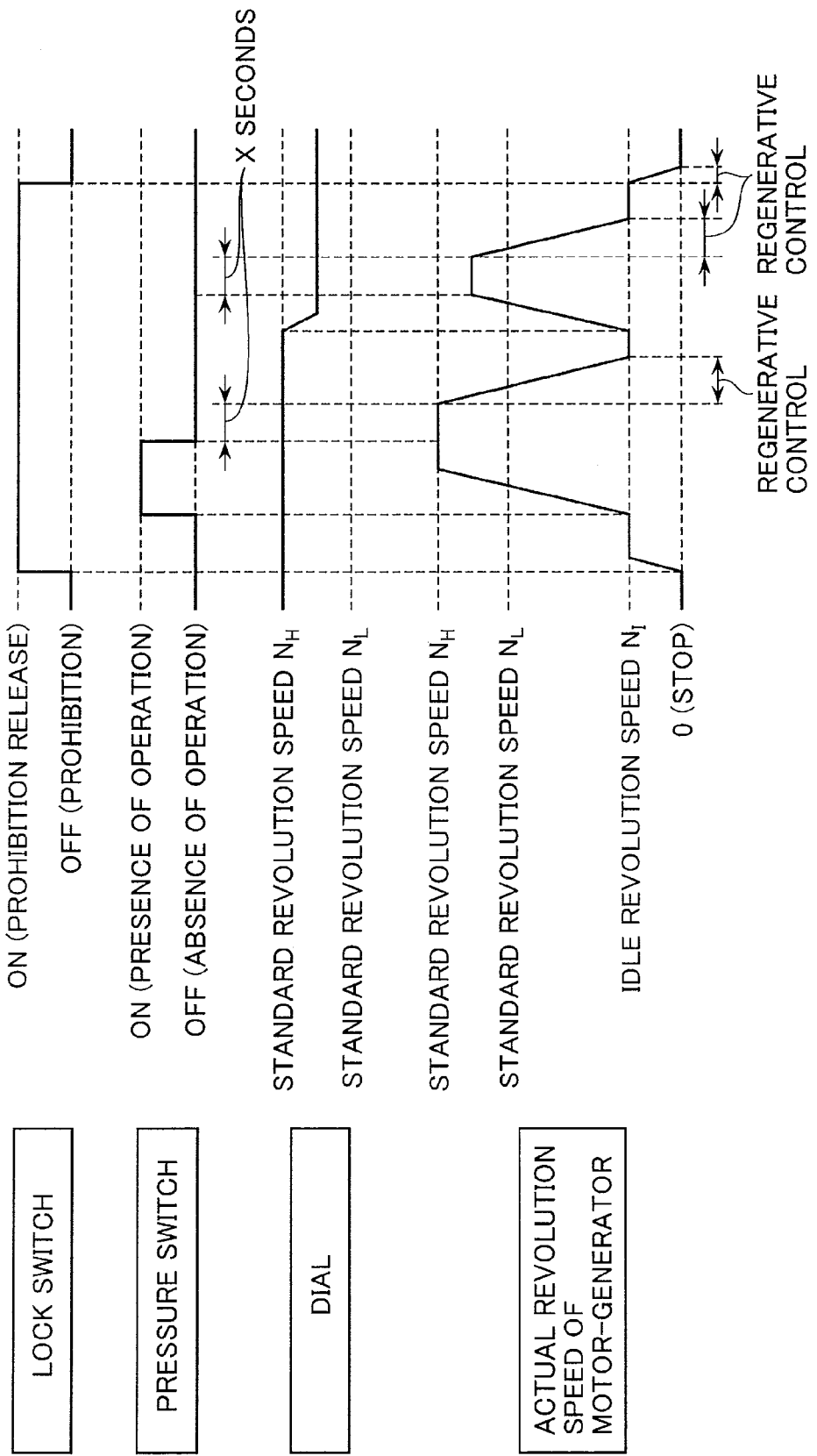
FIG. 5 is a time chart illustrating time changes in the actual revolution speed and the like of a motor-generator in the one embodiment of the present invention and shows a case where a gate lock lever is manipulated from a prohibition release position to a prohibition position during an idle operation to stop the motor-generator.

When the operator manipulates the gate lock lever 25 from the prohibition position to the prohibition release position as shown in FIG. 5, for example (i.e., when the lock switch 44 is turned ON), the bidirectional converter 28 drives the motor-generator 27 in such a manner that it takes the idle revolution speed $N_r$. When the operator manipulates any of the directional control valves through the corresponding control lever (i.e., when the pressure switch 41 is turned ON), in other words, the bidirectional converter 28 of the mini-excavator drives the motor-generator 27 in such a manner that it reaches, for example, the standard revolution speed $N_H$ set by the dial 26. Thereafter, when X seconds have elapsed in the state in which all the directional control valves are not operated (i.e., in the state in which the pressure switch 41 is OFF), the bidirectional converter 28 decelerates the motor-generator 27 from the standard revolution speed $N_H$ to the idle revolution speed $N_I$. At this time, the bidirectional converter 28 performs regenerative control to convert the inertial force of the rotor of the motor-generator 27 to power and charge the electric power storage device 7. That is, the bidirectional converter 28 charges the electric power storage device 7.

When the operator manipulates the dial 26 during the idle operation of the motor-generator 27, the bidirectional converter 28 drives the motor-generator 27 in such a manner that the motor-generator 27 reaches the standard revolution speed set by the dial 26. Thereafter, when X seconds have elapsed in the state in which all the directional control valves are not operated (i.e., in the state in which the pressure switch 41 is OFF), the bidirectional converter 28 decelerates the motor-generator 27 from the standard revolution speed to the idle revolution speed $N_I$. At this time, the bidirectional converter 28 performs regenerative control to convert the inertial force of the rotor of the motor-generator 27 to power and charge the electric power storage device 7. That is, the bidirectional converter 28 charges the electric power storage device 7.

When the operator manipulates the gate lock lever 25 from the prohibition release position to the prohibition position during the idle operation of the motor-generator 27, the bidirectional converter 28 stops the motor-generator 27. At this time, the bidirectional converter 28 performs regenerative control to convert the inertial force of the rotor of the motor-generator 27 to power and charge the electric power storage device 7. That is, the bidirectional converter 28 charges the electric power storage device 7.

Figure 6:
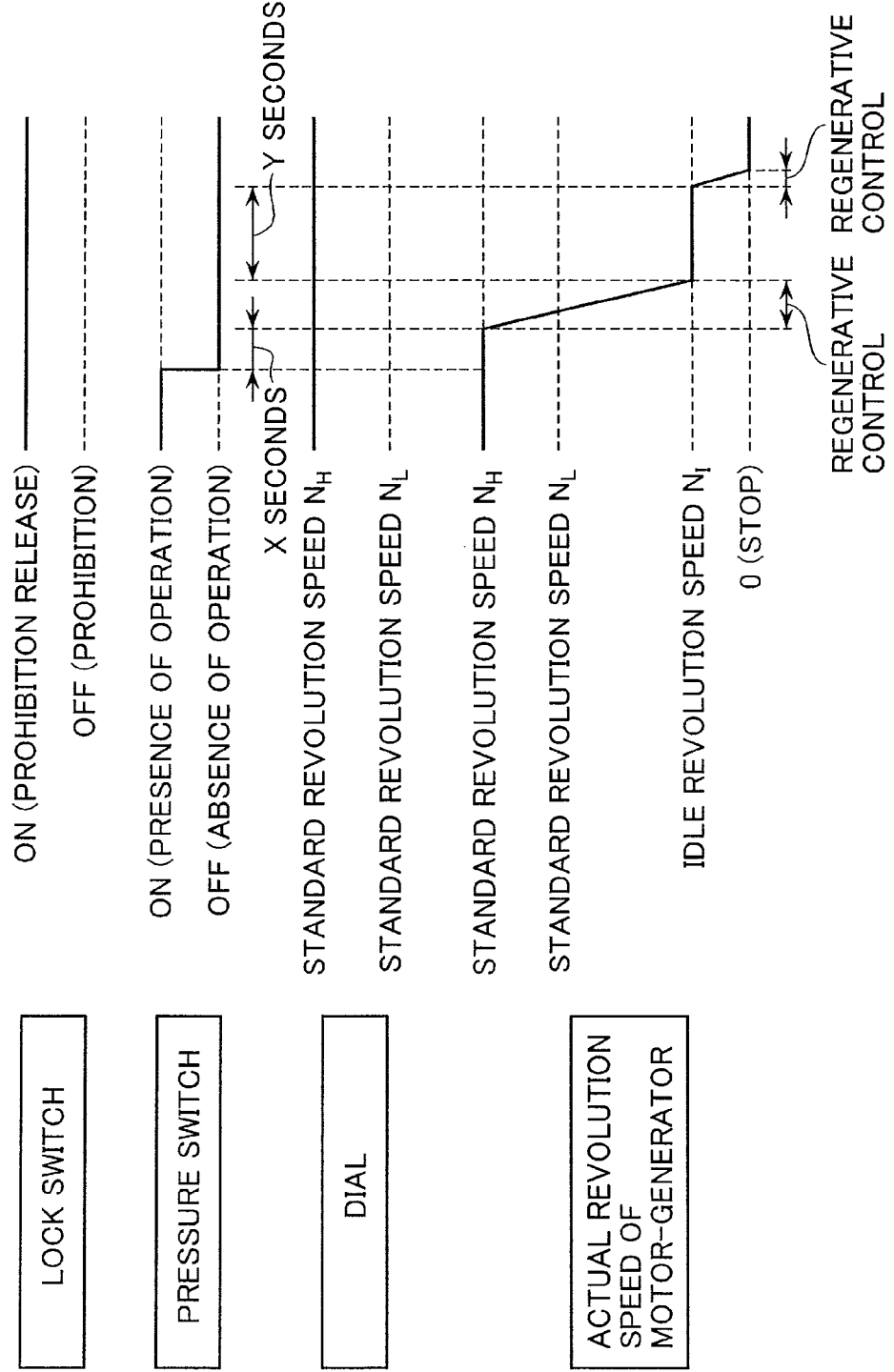
FIG. 6 is a time chart depicting time changes in the actual revolution speed and the like of the motor-generator in the one embodiment of the present invention and shows a case where an idle operation time elapses by Y seconds to stop the motor-generator.

On the other hand, as shown in FIG. 6 for example, when the gate lock lever 25 and the dial 26 are not operated during the idle operation of the motor-generator 27 and Y seconds have elapsed in the state in which all control levers are not operated, the bidirectional converter 28 stops the motor-generator 27. At this time, the bidirectional converter 28 performs regenerative control to convert the inertial force of the rotor of the motor-generator 27 to power and charge the electric power storage device 7. That is, the bidirectional converter 28 charges the electric power storage device 7.

In the present embodiment as described above, the electric power storage device 7 can be charged by performing the regenerative control when the motor-generator 27 is decelerated from the standard revolution speed to the idle revolution speed and deactivated, thereby making it possible to lengthen the operating time of the mini-excavator.

Incidentally, although the above one embodiment has been described by taking as an example the case where the bidirectional converter 28 has the control function of stopping the motor-generator 27 when the gate lock lever 25 is manipulated from the prohibition release position to the prohibition position and driving the motor-generator 27 when the gate lock lever 25 is manipulated from the prohibition position to the prohibition release position, the present embodiment is not limited to it, and the bidirectional converter 28 may not include this function. Although the above one embodiment has been explained by taking as an example the case where the bidirectional converter 28 has the control function of stopping the motor-generator 27 when the idle operation time of the motor-generator 27 has elapsed by Y seconds, the present embodiment is not limited to it, and the bidirectional converter 28 may not include this function. Alternatively, a switch may be provided which is capable of setting validation/invalidation of this function. Although the above one embodiment has been explained for taking as an example the case where the bidirectional converter 28 has the function of, when the motor-generator 27 is deactivated, performing the regenerative control to convert the inertial force of the rotor of the motor-generator 27 to power and charge the electric power storage device 7, the present embodiment is not limited to it. The bidirectional converter 28 may not have this function or a switch may be provided which is capable of setting validation/invalidation of this function. Even in such modifications, since the regenerative control is performed when the motor-generator 27 is decelerated from the standard revolution speed to the idle revolution speed, the electric power storage device 7 can be charged and the operating time of the mini-excavator can be made long.

Another embodiment of the present invention will be explained by FIGS. 7 through 9. The present embodiment is an embodiment in which when X seconds have elapsed in a state in which all directional control valves are not being operated during a standard operation of a motor-generator 27, the motor-generator 27 is stopped. Incidentally, in the present embodiment, parts equivalent to those in the above one embodiment are denoted by the same reference numerals, and their description is omitted as appropriate.

Figure 7:
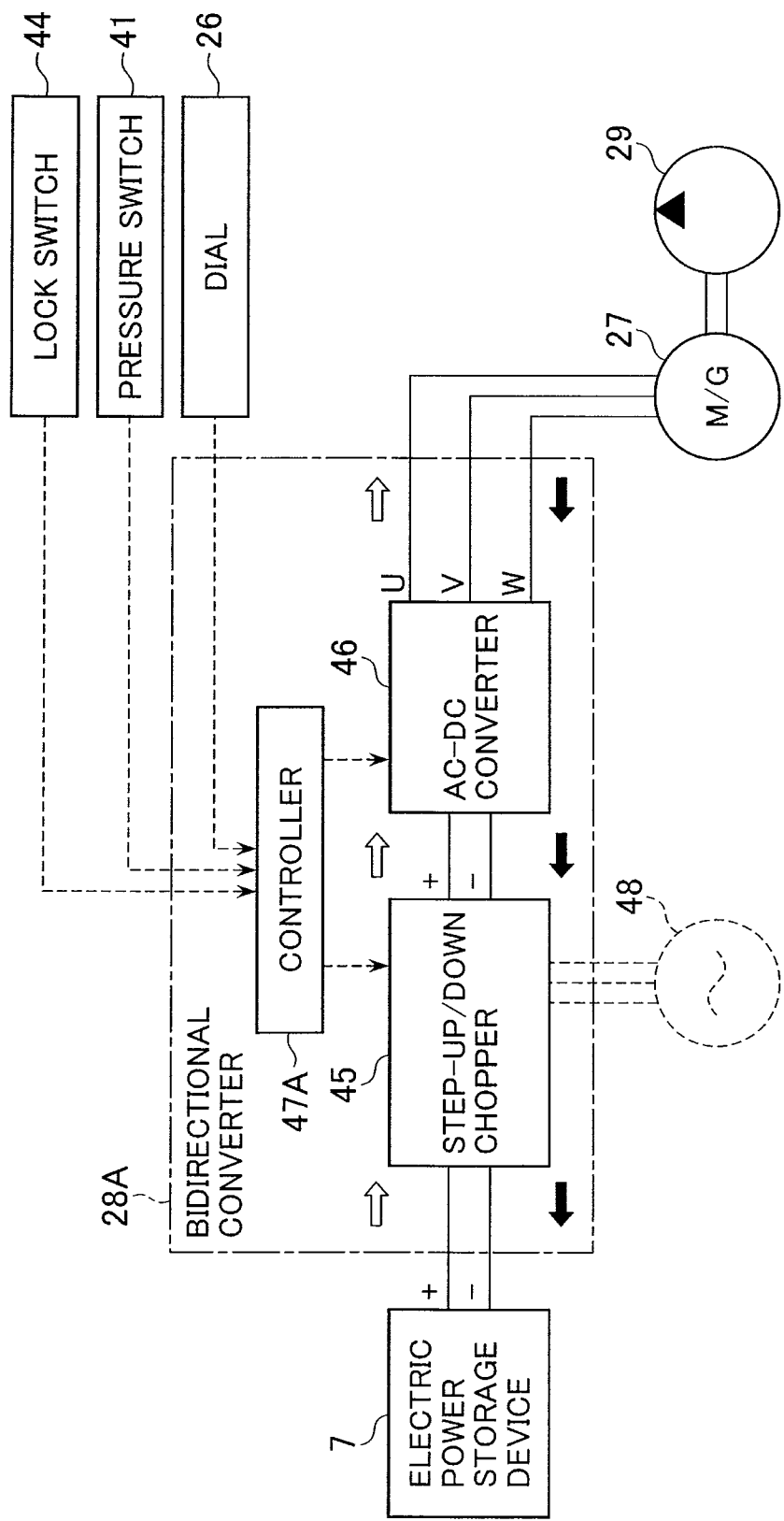
FIG. 7 is a block diagram showing a bidirectional converter in another embodiment of the present invention along with its related devices.

FIG. 7 is a block diagram showing a bidirectional converter in the present embodiment along with its related devices.

In the present embodiment, the bidirectional converter 28A is equipped with a step-up/down chopper 45, an AC-DC converter 46 and a controller 47A as with the bidirectional converter 28. The controller 47A inputs signals delivered from a lock switch 44, a pressure switch 41 and a dial 26 or the like therein and controls the step-up/down chopper 45 and the AC-DC converter 46 in response to these signals. Thus, the controller 47A switches the motor-generator 27 to the standard operation driven at the standard revolution speed set by the dial 26 or the stop.

Described in detail, the controller 47A determines based on the signal delivered from the lock switch 44 whether a gate lock lever 25 has been manipulated from a prohibition position or a prohibition release position. For example, when it is determined that the gate lock lever 25 has been manipulated from the prohibition release position to the prohibition position, the controller 47A stops the motor-generator 27. On the other hand, for example, when it is determined that the gate lock lever 25 has been manipulated from the prohibition position to the prohibition release position, the controller 47A controls the motor-generator 27 to be switched to the standard operation. The controller 47A determines based on the signal delivered from the pressure switch 41 whether all directional control valves are respectively in a non-operated state. For example, when X seconds (a few seconds) have elapsed in a state in which all the directional control valves are not operated during the standard operation of the motor-generator 27, the controller 47A stops the motor-generator 27. On the other hand, for example, when any of the directional control valves is operated during the stop of the motor-generator 27, the controller 47A controls the motor-generator 27 to be switched to the standard operation.

A large feature of the present embodiment lies in that the controller 47A causes the motor-generator 27 to operate as a motor during the standard operation of the motor-generator 27 and that when the controller 47A stops the motor-generator 27 from the standard operation, it causes the motor-generator 27 to operate as a generator (regenerative brake).

A control procedure of the above-described controller 47A will next be explained. FIG. 8 is a flowchart showing the contents of control processing of the controller 47A.

Figure 8:
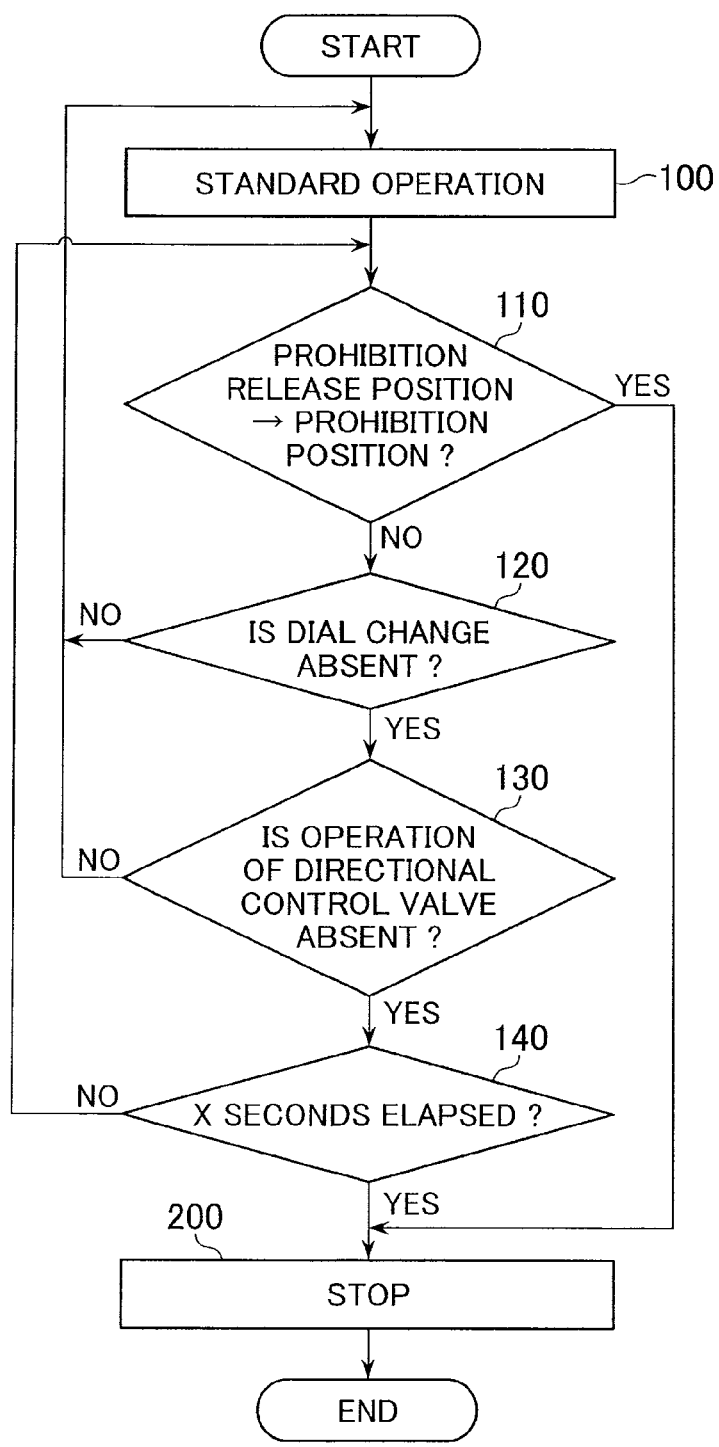
FIG. 8 is a flowchart illustrating the contents of control processing of a controller of the bidirectional converter in the above another embodiment of the present invention.

In FIG. 8, for example, when the gate lock lever 25 is manipulated to the prohibition release position, the controller 47A proceeds to Step 100, where it performs control on the standard operation of the motor-generator 27. That is, the controller 47A outputs a drive command to the step-up/down chopper 45 and the AC-DC converter 46. Also the controller 47A computes a voltage to be applied to the motor-generator 27, based on a difference between the standard revolution speed set by the dial 26 and the actual revolution speed (although not illustrated in detail, e.g., an actual revolution speed detected by a revolution speed sensor or an actual revolution speed computed based on the results of detection of a position sensor that detects a magnetic pole position of the motor-generator 27 and a current sensor that detects the primary current of the motor-generator 27) of the motor-generator 27 or the like, and outputs it to the AC-DC converter 46 as a voltage command. Then, the step-up/down chopper 45 steps up the voltage of DC power delivered from an electric power storage device 7 in response to the drive command and supplies it to the AC-DC converter 46. The AC-DC converter 46 generates AC power on the basis of the DC power delivered from the step-up/down chopper 45 in response to the drive command and the voltage command and applies the same to the motor-generator 27. Thus, the motor-generator 27 is driven at the standard revolution speed.

The controller 47A proceeds to Step 110, where it determines based on the signal delivered from the lock switch 44 whether the gate lock lever 25 has been manipulated from the prohibition release position to the prohibition position. For example, when it is determined that the gate lock lever 25 has not been manipulated to the prohibition position, the determination of Step 110 is not satisfied and hence the controller 47A proceeds to Step 120. At Step 120, the controller 47A determines based on the signal delivered from the dial 26 whether no change occurs in the position of operation of the dial 26. For example, when a change has occurred in the operation position of the dial 26, the determination of Step 120 is not satisfied and hence the controller 47A returns to the above Step 100, where the procedure similar to the above is performed. On the other hand, for example, when no change occurs in the operation position of the dial 26, the determination of Step 120 is satisfied and the controller 47A proceeds to Step 130.

At Step 130, the controller 47A determines based on the signal delivered from the pressure switch 41 whether all the directional control valves are respectively in a non-operated state. For example, when any of the directional control valves is operated, the determination of Step 130 is not satisfied and hence the controller 47A returns to the above Step 100, where the procedure similar to the above is conducted. On the other hand, for example, when all the directional control valves are respectively in the non-operated state, the determination of Step 130 is satisfied and hence the controller 47A proceeds to Step 140. At Step 140, the controller 47A determines whether X seconds have elapsed in the state in which all the directional control valves are not being operated. While X seconds do not elapse in the state in which all the directional control valves are not being operated, the determination of Step 140 is not satisfied and hence the controller 47A returns to the above Step 110, where the procedure similar to the above is repeated.

Then, the determinations of Steps 110 through 130 are repeatedly performed. For example, if X seconds have elapsed in the state in which all the directional control valves are not being operated, the determination of Step 140 is satisfied and hence the controller 47A determines that the mini-excavator is at the stage of transiting from the operational state to the halt state. The controller 47A proceeds to Step 200, where it performs control on the stop of the motor-generator 27. Described in detail, the controller 47A outputs a regeneration command to the step-up/down chopper 45 and the AC-DC converter 46 until the motor-generator 27 stops. Then, in response to the regeneration command, the AC-DC converter 46 converts an inertial force of a rotor of the motor-generator 27 to AC power and converts the AC power to DC power. The step-up/down chopper 45 boosts the voltage of the DC power delivered from the AC-DC converter 46 in response to the regeneration command and supplies the same to the electric power storage device 7. Thus, the electric power storage device 7 is charged.

For example, when it is determined at the above Step 110 that the gate lock lever 25 has been manipulated from the prohibition release position to the prohibition position, the determination of Step 110 is satisfied. Thus, the controller 47A determines that the mini-excavator is at the stage of transiting from the operational state to the halt state. Then, the controller 47A proceeds to the above Step 200, where it performs control on the stop of the motor-generator 27. Even at this time, the electric power storage device 7 is charged.

Incidentally, in the above, the above Steps 130, 140 and 200 conducted by the controller 47A of the bidirectional converter 28A configure stop control means, as claimed in claims, which when a predetermined time set in advance has elapsed in a state in which a plurality of directional control valves have all not been operated, stops a motor-generator that has been controlled at a set revolution speed set in advance in such a manner that a plurality of hydraulic actuators are drivable before the elapse of the predetermined time. The above Steps 110 and 200 conducted by the controller 47A of the bidirectional converter 28A configure stop control means which when the gate lock lever is manipulated from the prohibition release position to the prohibition position, stops the motor-generator that has been controlled at a set revolution speed set in advance in such a manner that a plurality of hydraulic actuators are drivable.

The operation and operative effects of the present embodiment will next be described using FIG. 9.

Figure 9:
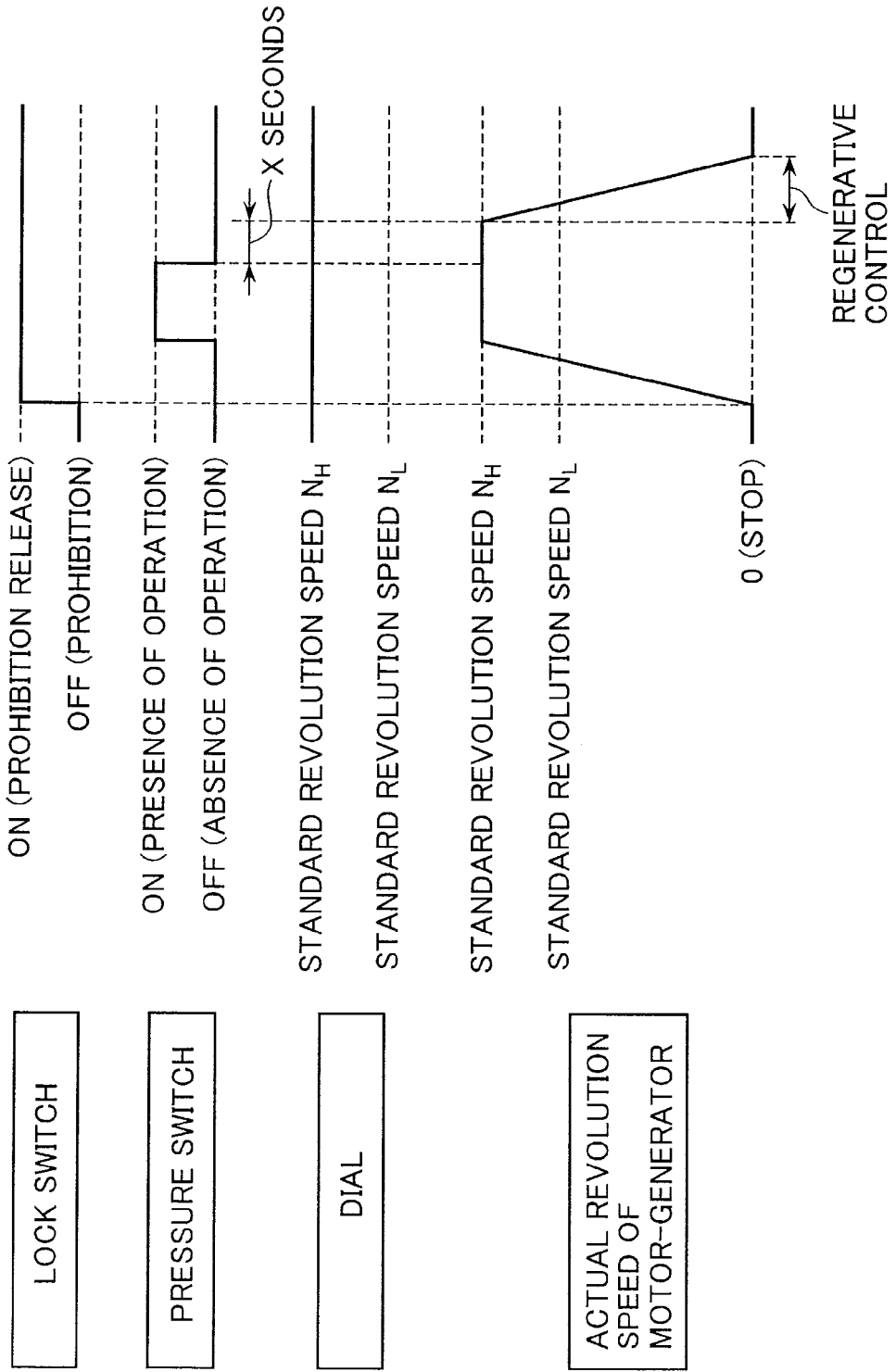
FIG. 9 is a time chart depicting time changes in the actual revolution speed and the like of a motor-generator in the above another embodiment of the present invention.

When the operator manipulates the gate lock lever 25 from the prohibition position to the prohibition release position as shown in FIG. 9, for example (i.e., when the lock switch 44 is turned ON), the bidirectional converter 28A drives the motor-generator 27 in such a manner that it takes, for example, a standard revolution speed $N_H$ set by the dial 26. When X seconds have elapsed in the state in which all the directional control valves are not operated (i.e., in the state in which the pressure switch 41 is OFF) after the motor-generator 27 has reached the standard revolution speed $N_H$, the bidirectional converter 28A stops the motor-generator 27. At this time, the bidirectional converter 28A performs regenerative control to convert the inertial force of the rotor of the motor-generator 27 to power and charge the electric power storage device 7. That is, the bidirectional converter 28A charges the electric power storage device 7.

When the operator manipulates the gate lock lever 25 from the prohibition release position to the prohibition position during the standard operation of the motor-generator 27 although not illustrated in the drawing, the bidirectional converter 28A stops the motor-generator 27. At this time, the bidirectional converter 28A performs regenerative control to convert the inertial force of the rotor of the motor-generator 27 to power and charge the electric power storage device 7. That is, the bidirectional converter 28A charges the electric power storage device 7.

In the present embodiment as described above, the electric power storage device 7 can be charged by performing the regenerative control when the motor-generator 27 is stopped, at the stage in which the mini-excavator is transitioned from the operational state to the halt state, thereby making it possible to lengthen the operating time of the mini-excavator.

Incidentally, although the above embodiment has been explained by taking as an example the case where the hydraulic pilot type operating devices 31 and 33 and the like each of which outputs pilot pressures corresponding to the position of operation of each control lever, are provided as a plurality of operating means that respectively operate the directional control valves 32 and 34 and the like, the present embodiment is not limited to it. That is, they may be configured as electrical lever type operating devices each of which outputs an electrical control signal corresponding to the position of operation of each control lever, for example. In this case, there may be provided, for example, a pair of electromagnetic pressure reducing valves that generates pilot pressures with the delivery pressure of the pilot pump 30 as its original pressure and outputs the same to each directional control valve, and a control unit that controls the pair of electromagnetic pressure reducing valves in response to the electrical control signal delivered from the operating device. Even in such a case, advantageous effects similar to the above can be obtained.

Although the above embodiment has been described by taking as an example the case where the pressure switch 41 or the like is provided as operation detecting means which detects the presence or absence of the operation of each of the directional control valves 32 and 34 and the like, the present embodiment is not limited to it. That is, for example, a shuttle valve group that extracts the maximum pressure of pilot pressures output from operating devices may be provided without providing the hydraulic signal line 38, the signal paths of the respective directional control valves, the fixed restrictor 40 and the pressure switch 41, and a pressure switch may be provided on the output side of the last-stage shuttle valve in the shuttle valve group. For example, the presence or absence of the operation of each of the directional control valves 32 and 34 and the like may be determined by providing a pressure sensor instead of the pressure switch and allowing a controller of a bidirectional converter to determine whether pressure detected by the pressure sensor has reached a predetermined threshold value. For example, when the above-described electrical lever type operating devices are adopted, the control unit may determine the presence or absence of the operation of each of the directional control valves 32 and 34 and the like, based on control signals outputted to the electromagnetic pressure reducing valve (in other words, the electrical control signal delivered from the operating device and the signal delivered from the lock switch, etc.). Even in such case, advantageous effects similar to the above can be obtained.

Although the above embodiment has been explained by taking as an example the case where the lock valve 43 that allows the delivery line 39 of the pilot pump 30 to communicate and be cut off according to the operation position (in other words, ON/OFF of the lock switch 44) of the gate lock lever 25 is provided as prohibiting means which prohibits the operations of a plurality of directional control valves where the gate lock lever 25 is manipulated to the prohibition position, the present embodiment is not limited to it. That is, for example, when the above electrical lever type operating devices are adopted, the control unit may perform control to validate/invalidate the electrical control signal delivered from the operating device in response to the signal delivered from the lock switch 44. Even in such a case, advantageous effects similar to the above can be obtained.

Although the above embodiment has been described by taking as an example the case where the bidirectional converter 28 (or 28A) is configured so as to be capable of selectively performing a first control mode for supplying power delivered from the electric power storage device 7 to the motor-generator 27 to drive the motor-generator 27, and a second control mode for supplying power from the external power supply to the electric power storage device 7 to charge the electric power storage device 7, and the bidirectional converter 28 (or 28A) performs regenerative control when the motor-generator 27 is decelerated from the standard revolution speed to the idle revolution speed or stopped during the first control mode, the present embodiment is not limited to it. That is, the bidirectional converter may be configured so as to be capable of selectively performing according to the operation of a mode selection switch (not shown), the above-described first and second control modes, a third control mode for supplying power delivered from the external power supply to the motor-generator 27 to drive the motor-generator 27, and a fourth control mode for supplying power delivered from the external power supply to the motor-generator 27 and the electric power storage device 7 to drive the motor-generator 27 and charge the electric power storage device 7. The bidirectional converter may perform regenerative control when the motor-generator 27 is decelerated from the standard revolution speed to the idle revolution speed or stopped during the third or fourth control mode. Even in such a case, advantageous effects similar to the above can be obtained.

Figure 10:
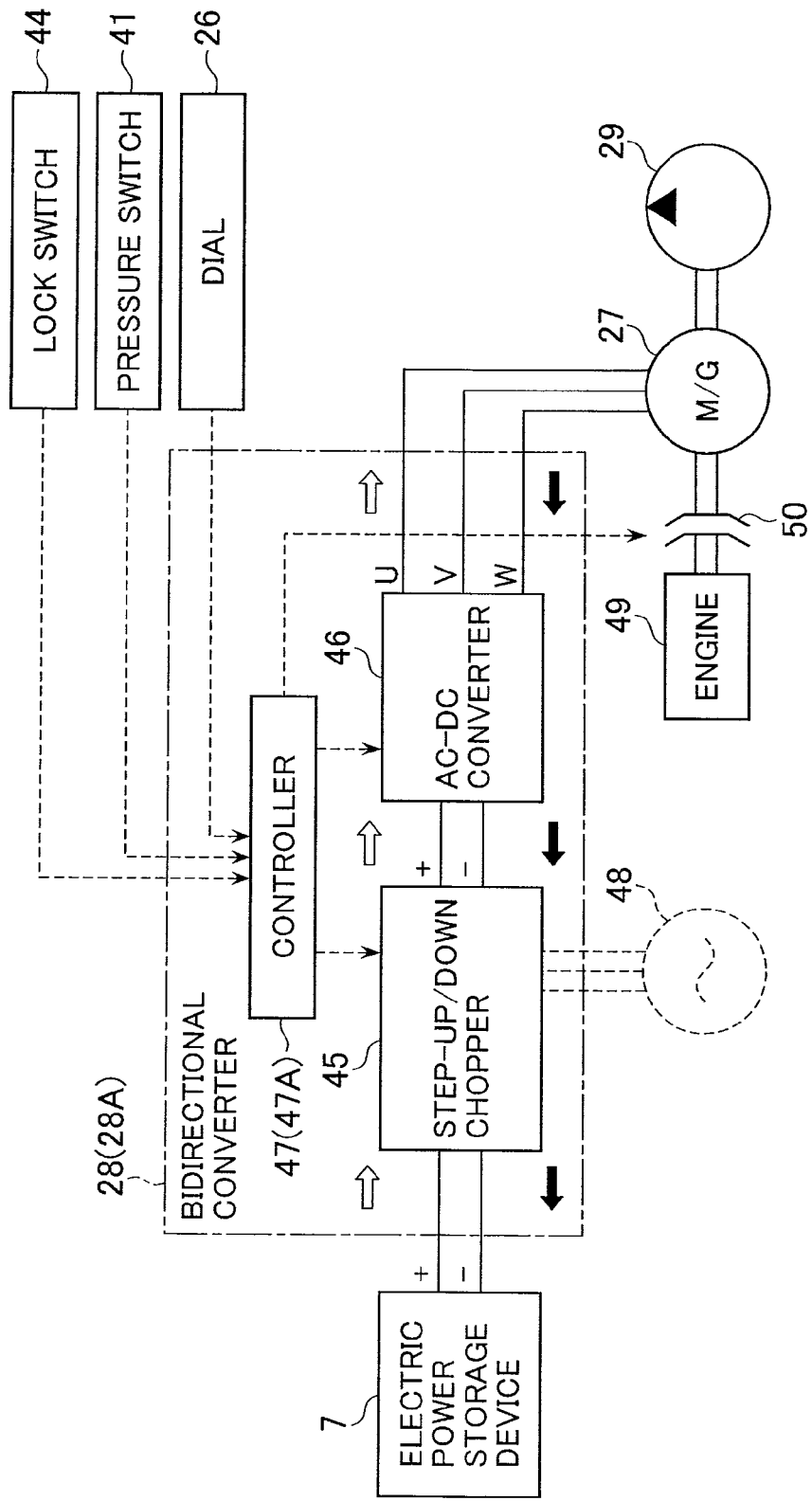
FIG. 10 is a block diagram showing a bidirectional converter in one modification of the present invention along with its related devices.

Incidentally, although the above has been explained as a target to which the present invention is applied, by taking as an example the mini-excavator in which the hydraulic pump 29 and the like are driven by the motor-generator 27 alone, the present invention is not limited to it. That is, the present invention may be applied to, for example, a hybrid type mini-excavator driven by a motor-generator and an engine. In this case, as shown in FIG. 10, for example, a clutch mechanism 49 is provided at a connecting portion between a motor-generator 27 and an engine 48. When the motor-generator 27 is decelerated and stopped, a bidirectional converter 28 (or 28A) may control the clutch mechanism 49 to disconnect the motor-generator 27 and the engine 48 from each other. Thus, the bidirectional converter is capable of performing regenerative control to convert an inertial force of a rotor of the motor-generator 27 to power and charge an electric power storage device 7. Accordingly, it is possible to charge the electric power storage device 7 and make the operating time of the mini-excavator long.

The present invention is not limited to the mini-excavator, but may be applied to a middle-sized or large-sized hydraulic excavator (hydraulic excavator having an operating mass of more than 6 tons). The present invention may be applied not only to the hydraulic excavators but also to other construction machines such as a hydraulic crane, etc.

Description of Reference Symbols

7 Electric power storage device
13A Traveling hydraulic motor
13B Traveling hydraulic motor
19 Boom hydraulic cylinder
20 Arm hydraulic cylinder
21 Bucket hydraulic cylinder
25 Gate lock lever
27 Motor-generator 28 Bidirectional converter (idle control means, stop control means)
28A Bidirectional converter (stop control means)
29 Hydraulic pump
31 Operating device (operating means)
32 Left traveling directional control valve
33 Operating device (operating means)
34 Boom directional control valve
41 Pressure switch (operation detecting means)
43 Lock valve (prohibiting means)

The invention claimed is:

1. An electromotive drive device for a construction machine, comprising:
an electric power storage device (7);
a motor-generator (27) which performs a transfer of power to and from the electric power storage device (7);
a hydraulic pump (29) driven by the motor-generator (27);
a plurality of hydraulic actuators (13A, 19);
a plurality of directional control valves (32, 34) which respectively control the flow of pressurized fluid from the hydraulic pump (29) to the plurality of hydraulic actuators (13A, 19); and
a plurality of operating means (31, 33) which respectively operate the plurality of directional control valves (32, 34),
wherein the electromotive drive device has
operation detecting means (41) which detects the presence or absence of operations of the plurality of directional control valves (32, 34), and
idle control means (28) which when a first time (X seconds) set in advance has elapsed in a state in which the plurality of directional control valves (32, 34) are all not operated, decelerates the motor-generator (27) controlled at a set revolution speed set in advance in such a manner that the plurality of hydraulic actuators (13A, 19) are drivable before the elapse of the first time, to a low revolution speed ($N_I$) set in advance lower than the set revolution speed, and
wherein when the idle control means (28) decelerates the motor-generator (27) from the set revolution speed suitable for work to the low revolution speed ($N_I$) at the stage of a transition of the construction machine from an operational state to a halt state, the idle control means (28) performs regenerative control to convert an inertial force of a rotor of the motor-generator (27) to power and charge the electric power storage device (7).

2. The electromotive drive device according to claim 1, including
first stop control means (28) which stops the motor-generator (27) when the motor-generator (27) is decelerated to the low revolution speed ($N_I$) and thereafter a second time (Y seconds) set in advance further has elapsed in the state in which the plurality of directional control valves (32, 34) are not operated,
wherein when the motor-generator (27) is stopped from a driven state thereof at the low revolution speed ($N_I$), the first stop control means (28) performs regenerative control to convert the inertial force of the rotor of the motor-generator (27) to power and charge the electric power storage device (7).

3. The electromotive drive device according to claim 2, including:
a gate lock lever (25) which is provided at a platform and manipulated to a prohibition release position and a prohibition position;
prohibiting means (43) which prohibits the operation of each of the plurality of directional control valves (32, 34) when the gate lock lever (25) is manipulated to the prohibition position; and
second stop control means (28) which stops the motor-generator (27) when the gate lock lever (25) is manipulated to the prohibition position,
wherein when the motor-generator (27) is stopped, the second stop control means (28) performs regenerative control to convert the inertial force of the rotor of the motor-generator (27) to power and charge the electric power storage device (7).

4. The electromotive drive device according to claim 1, including:
a gate lock lever (25) which is provided at a platform and manipulated to a prohibition release position and a prohibition position;
prohibiting means (43) which prohibits the operation of each of the plurality of directional control valves (32, 34) when the gate lock lever (25) is manipulated to the prohibition position; and
second stop control means (28) which stops the motor-generator (27) when the gate lock lever (25) is manipulated to the prohibition position,
wherein when the motor-generator (27) is stopped, the second stop control means (28) performs regenerative control to convert the inertial force of the rotor of the motor-generator (27) to power and charge the electric power storage device (7).

5. An electromotive drive device for a construction machine, comprising:
an electric power storage device (7);
a motor-generator (27) which performs a transfer of power to and from the electric power storage device (7);
a hydraulic pump (29) driven by the motor-generator (27);
a plurality of hydraulic actuators (13A, 19);
a plurality of directional control valves (32, 34) which respectively control the flow of pressurized fluid from the hydraulic pump (29) to the plurality of hydraulic actuators (13A, 19); and
a plurality of operating means (31, 33) which respectively operate the plurality of directional control valves (32, 34),
wherein the electromotive drive device includes:
operation detecting means (41) which detects the presence or absence of operation of each of the plurality of directional control valves (32, 34), and
stop control means (28A) which when a predetermined time (X seconds) set in advance has elapsed in a state in which the plurality of directional control valves (32, 34) are all not operated, stops the motor-generator (27) controlled at a set revolution speed set in advance in such a manner that the plurality of hydraulic actuators (13A, 19) are drivable before the elapse of the predetermined time, and
wherein when the stop control means (28A) stops the motor-generator (27) from a driven state thereof at the set revolution speed suitable for work at the stage of a transition of the construction machine from an operational state to a halt state, the stop control means (28A) performs regenerative control to convert an inertial force of a rotor of the motor-generator (27) to power and charge the electric power storage device (7).

6. An electromotive drive device for a construction machine, comprising:
- an electric power storage device (7);
- a motor-generator (27) which performs a transfer of power to and from the electric power storage device (7);
- a hydraulic pump (29) driven by the motor-generator (27);
- a plurality of hydraulic actuators (13A, 19);
- a plurality of directional control valves (32, 34) which respectively control the flow of pressurized fluid from the hydraulic pump (29) to the plurality of hydraulic actuators (13A, 19); and
- a plurality of operating means (31, 33) which respectively operate the plurality of directional control valves (32, 34), wherein the electromotive drive device includes:
- a gate lock lever (25) which is provided at a platform and manipulated to a prohibition release position and a prohibition position;
- prohibiting means (43) which prohibits the operation of each of the plurality of directional control valves (32, 34) when the gate lock lever (25) is manipulated to the prohibition position; and
- stop control means (28; 28A) which when the gate lock lever (25) is manipulated from the prohibition release position to the prohibition position, stops the motor-generator (27) controlled at a set revolution speed set in advance in such a manner that the plurality of hydraulic actuators (13A, 19) are drivable, and wherein when the stop control means (28; 28A) stops the motor-generator (27) from a driven state thereof at the set revolution speed suitable for work at the stage of a transition of the construction machine from an operational state to a halt state, the stop control means (28; 28A) performs regenerative control to convert an inertial force of a rotor of the motor-generator (27) to power and charge the electric power storage device (7).

* * * * *